United States Patent [19]

Sawada et al.

[11] Patent Number: 4,882,188

[45] Date of Patent: Nov. 21, 1989

[54] PROCESS FOR PREPARING HEAT TREATED GRANULAR SOLID FOOD

[75] Inventors: Hiroshi Sawada, Osaka, Japan; Richard L. Merson, Davis, Calif.

[73] Assignee: Nakamura & Partners, Tokyo, Japan

[21] Appl. No.: 191,813

[22] Filed: May 2, 1988

Related U.S. Application Data

[63] Continuation of Ser. No. 767,528, Aug. 20, 1985, abandoned.

[30] Foreign Application Priority Data

Feb. 22, 1985 [JP] Japan .................................. 60-33909

[51] Int. Cl.[4] .............................. A23L 1/00; A23L 3/16
[52] U.S. Cl. .................................... 426/438; 426/506; 426/507; 426/508; 426/509; 99/409; 99/470
[58] Field of Search ............... 426/467, 521, 523, 508, 426/506, 509, 510, 511, 507, 519, 438, 439, 440; 99/348, 406, 409, 470

[56] References Cited

U.S. PATENT DOCUMENTS

| | | |
|---|---|---|
| Re. 31,513 | 1/1984 | Glen ................................... 426/521 |
| 2,212,120 | 8/1940 | Kneale et al. ........................ 426/467 |
| 3,122,439 | 2/1964 | MacAllister ......................... 426/467 |
| 3,149,976 | 9/1964 | Smith .................................. 426/467 |
| 3,531,300 | 9/1970 | Greenberg et al. ................. 426/412 |
| 3,682,665 | 8/1972 | Diar ....................................... 99/409 |
| 3,769,028 | 10/1973 | Katz et al. ............................ 426/523 |
| 3,801,715 | 4/1974 | Smith .................................. 426/467 |
| 3,843,826 | 10/1974 | Hirakawa et al. .................. 426/399 |
| 3,865,965 | 2/1975 | Davis et al. ......................... 426/519 |
| 3,885,056 | 5/1975 | Smith et al. ......................... 426/467 |
| 3,934,497 | 1/1976 | Hannah ............................... 426/510 |
| 4,059,919 | 11/1977 | Green .................................. 426/509 |
| 4,189,504 | 2/1980 | Jimenez .............................. 426/509 |
| 4,214,013 | 7/1980 | Hirahara ............................. 426/509 |
| 4,214,514 | 7/1980 | Contino et al. ..................... 426/509 |
| 4,215,151 | 7/1980 | Rios et al. ........................... 426/467 |
| 4,444,797 | 4/1984 | Brittain et al. ..................... 426/509 |
| 4,473,593 | 9/1984 | Sturgeon ............................ 426/510 |

FOREIGN PATENT DOCUMENTS

| | | |
|---|---|---|
| 679348 | 2/1964 | Canada ............................... 426/467 |
| 0003721 | 8/1979 | European Pat. Off. ............ 426/509 |

Primary Examiner—Steven Weinstein
Attorney, Agent, or Firm—Flehr, Hohbach, Test, Albritton & Herbert

[57] ABSTRACT

The present invention relates generally to a batch process for preparing a heat treated granular solid foodstuff, and more particularly it relates to a process wherein a granular solid food is sufficiently heated deep into the center portion thereof to be sterilized and/or cooked and then cooled without impairing the appearance and flavor thereof. The heating and cooling occur by heated and cooled liquids which fluidize the granular solid food.

8 Claims, 1 Drawing Sheet

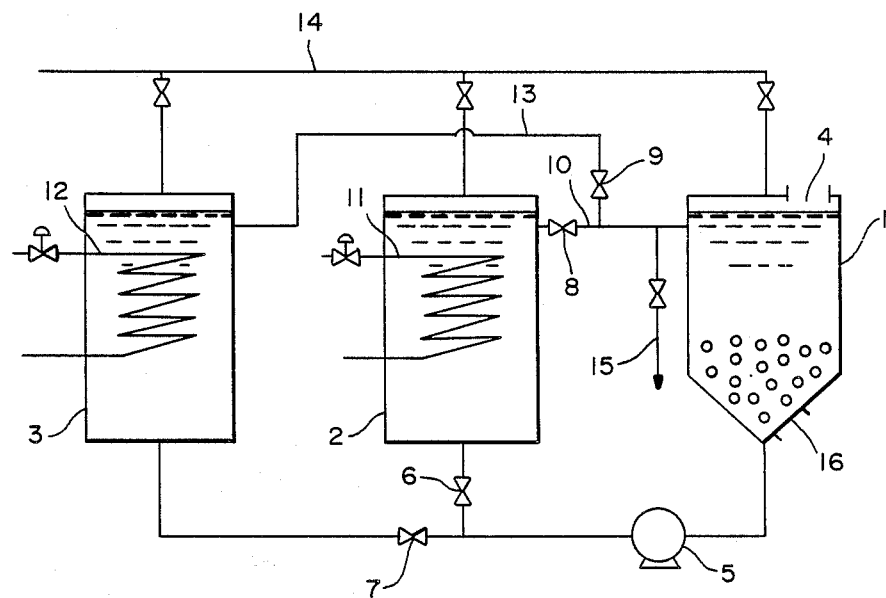

PROCESS FOR PREPARING HEAT TREATED GRANULAR SOLID FOOD

This is a continuation of application Ser. No. 767,528, filed Aug. 20, 1985, now abandoned.

BACKGROUND OF THE INVENTION

1. Field of Art

The present invention relates generally to a process and apparatus for preparing a heat treated solid foodstuff, and more particularly it relates to a process wherein a solid food is sufficiently heated deep into the center portion thereof to be sterilized and/or cooked and then cooled without impairing the appearance and flavour thereof.

2. Prior Art

The known methods of processing solid foodstuffs to give them with good storage properties involve the technique of hermetically packing foods in containers, such as cans or flexible pouches, followed by heating to sterilize the thus packed foods. However, the aforementioned processing method has a disadvantage that the textures and shapes of packed solid foods are apt to be disintegrated due to heating which had to be continued for a long time in order to sterilize or cook the contents located at the center portions in the cans or pouches sufficiently, with attendant disadvantages that the flavours and tastes of the contained foods are deteriorated.

An aseptic filling-packing technology attracts public attention, because it provides economical merits and ensures safety in operations and high production quality. In the aseptic filling-packing technology, a foodstuff is presterilized at a high temperature for a short period of time before it is packed in a container. However, up to date, the aforementioned aseptic filling-packing technology has been applied only for the preparation of liquid foodstuffs, such as milk and juice; and there is found extremely few cases where the aseptic filling-packing is successfully applied for commercial productions of solid foodstuffs or liquid foodstuffs containing solid ingredients.

This is because a solid food is hardly sterilized deep into the center portion thereof while preserving integrity or shape thereof.

A known process for the sterilization of a food containing solid ingredients is a continuous sterilization process utilizing a scraped surface heat exchanger. However, since the conditions for sterilization in this known process are set to sterilize the solid ingredients contained therein sufficiently, there arises a problem that the liquid composition of the food, such as sauce, is often heated excessively to result in deterioration in quality of the liquid composition.

Moreover, the residence time in the heat exchanger or a holding tube of the solid ingredients contained in the processed food varies significantly, leading to the result that the solid ingredients are not evenly sterilized. In order to effect uniform and full sterilization of solid ingredients thereby to ensure sterility of the finished product, the process must be designed to have an extremely large tolerance or safety factor.

With the aim of excluding various disadvantages of the conventional processes, as described above, there has been developed a system for filling and packing a food consisting of a solid ingredient and a sauce composition, which comprises the step of sterilizing solely the solid ingredient in a batch type container, the step of sterilizing and then cooling the sauce composition separately by means of a heat exchanger, and the step of aseptically mixing the sterilized solid ingredient with the separately sterilized sauce composition. Such a process is disclosed, for example, in British Pat. Nos. 1,575,069 and 1,575,070.

However, since the batch type processing vessel is rotated to effect even and full sterilization of solid ingredients and to mix the solid ingredients uniformly in the sauce, in the known system described in the preceding paragraph, the solid ingredients are apt to be deformed or collapsed. Further disadvantages of the system are that the tubing and connections for feeding the sterilized sauce to the container are so complicated that it requires intricate operations and that a risk of secondary contamination is increased.

OBJECTS AND SUMMARY OF THE INVENTION

A primary object of this invention is to provide a process for preparing a heat treated solid foodstuff, wherein the solid foodstuff is effectively heated and then cooled for effecting sterilization and cooking uniformly at the center portion thereof without deteriorating appearance, flavour and taste of the foodstuff.

Another object of this invention is to provide an apparatus utilizable for the practice of such a process.

A further object of this invention is to provide a process wherein a solid particulate foodstuff is contained in a processing vessel into which a liquid heating medium and then a liquid cooling medium are supplied from the bottom thereof to float and fluidize the solid particulate by thus supplied heating and cooling media, thereby to heat and cool each of the solid granules from the entire surface area evenly and effectively to improve heat exchange efficiency so that each granule is evenly heated and then cooled rapidly to the center portion thereof.

A still further object of this invention is to provide a process wherein liquid heating and cooling media are used to heat and cool the solid granules in a fluidized condition to minimize physical impairment of respective granules due to cushion effect of the liquid heating and cooling media.

In view of the above and other objects of the invention, the present invention provides a process for preparing a heat treated particulate solid food, comprising the step of putting a granular solid food having a granule diameter of from 3 to 45 mm in a processing vessel; the heating step of supplying a liquid heating medium from the bottom of said processing vessel at a feed rate so that the void fraction of the bed of said granular solid food becomes 0.38 to 0.8 thereby by subject said granular solid food to heat treatment in a fluidized condition, and the subsequent cooling step of supplying a liquid cooling medium from the bottom of said processing vessel at a feed rate so that the void fraction of the bed of said granular solid food is held within 0.38 to 0.8 thereby to cool said granular solid food in a fluidized condition.

According to another aspect of the invention, there is provided an apparatus for preparing a heat treated granular solid food comprising: (a) a processing vessel for containing a granular solid food in a fluidized condition and having inlet and outlet ports through which liquid heating and cooling media are introduced and discharged; (b) a storage tank containing said liquid heating medium and communicated with said processing vessel for maintaining said heating medium at a pre-set temperature; (c) a storage tank containing said liquid cooling medium and communicated with said processing vessel for maintaining said cooling medium at a pre-set temperature; and (d) pressure control means connected to said processing vessel, said heating medium storage tank and said cooling medium storage tank for adjusting the internal pressures in each of said vessel and tanks.

The foodstuffs which may be processed by the present invention include every kinds of granular solid foods; the examples being meats and processed meats such as beef, pork, chicken, fowl, bacon and sausage; vegetables such as radish, carrot, potato and pumpkin; beans such as soybean, greenpeas and red bean; cereals such as rice and corn; fruits such as oranges, pineapple, raisins and peach; fishery products such as tuna, salmon, shrimps and short-necked clam, and processed products of fishes and shellfishes such as boiled fishpaste; edible fungi such as mushroom; alimentary paste products such as macaroni; and mixtures of the foodstuffs listed above. Pet foods may also be processed through the process of the invention.

It is desirous that the diameter of each granule of the solid foodstuff to be treated ranges generally within 3 to 45 mm, preferably within 5 to 35 mm. A solid foodstuff composed of granules each having a diameter of less than 3 mm can be heated to the center thereof even when processed through the conventional processes, and there is no need to heat or cool such granules particularly in a fluidized condition. If a solid foodstuff composed of granules each having a diameter of less than 3 mm is processed in a fluidized condition, according to the invention, granules tend to be carried away beyond the top weir of the processing vessel. The diameter of each granule should not exceed 45 mm, since the center portions of the larger diameter granules of solid foodstuff cannot be sufficiently heated with the surface thereof being overheated. Moreover, in order to fluidize such larger diameter granules, the heating and cooling media must be supplied at an extremely, or even abnormally, high feed rate and flown at an extremely high velocity.

DESCRIPTION OF THE DRAWING

The single FIGURE in the appended drawing shows diagrammatically an apparatus used for carrying out the process of the invention.

EMBODIMENT OF THE INVENTION

The present invention will now be described more specifically by referring to the drawing showing an exemplary processing system according to the invention.

Referring to the drawing, the system comprises a processing vessel 1 in which a foodstuff is heated and cooled, a storage tank 2 from which a heating medium is supplied, another storage tank 3 from which a cooling medium is supplied, and means for controlling the pressure within the system.

In operation of the system, a foodstuff to be heated therein is charged in the processing vessel 1 through a charge port 4. After closing the charge port 4 to hermetically close the processing vessel 1, a pump 5 is actuated to introduce a liquid heating medium, such as hot water or oil, from the heating medium storage tank 2 into the processing vessel 1 through an inlet port provided on the bottom of the processing vessel 1. During this heating step, valves 6 and 8 of the system are opened and valves 7 and 9 are closed.

The heating medium is recovered from the top of the processing vessel 1 and returned through a conduit 10 to the heating medium storage tank 2. The heating medium is, thus, forcibly recirculated between the processing vessel and the heating medium storage tank 2 by means of the pump 5.

By the operation as aforementioned, the solid foodstuff is floated and fluidized by the heating medium flow in the processing vessel 1 during the heating step.

The temperature of the heating medium may be maintained at a constant level by supplementing heat taken by the solid foodstuff in the processing vessel 1, using, for example, a heating coil 11 disposed in the heating medium storage tank 2.

In the present invention, the solid foodstuff in the processing vessel 1 is cooled by changing over the valves such that the valves 6 and 8 are closed and the valves 7 and 9 are opened to introduce a liquid cooling medium, such as cold water, from the cooling medium storage tank 3 into the processing vessel 1 through an inlet port provided at the bottom of the vessel 1. During this cooling operation with the respective valves being opened and closed, as aforementioned, the cooling medium is recovered from the top of the processing vessel 1 through a conduit 13 into the cooling medium storage tank 3. Thus, the cooling medium is forcibly recirculated, through the pump 5, between the processing vessel 1 and the cooling medium storage tank 3.

As a result, granules of solid foodstuff are floated by the flow of cooling medium and cooled thereby in the fluidized condition.

The temperature of the cooling medium may be maintained at a constant level, for example, by the provision of a cooling coil 12 in the cooling medium storage tank. In order to facilitate temperature control of the cooling medium in the cooling medium storage tank 3 at the initial stage of exchanging the medium introduced in the processing vessel 1 from the heating medium to the cooling medium, the heating medium left in the processing vessel 1 may be discharged, for example, through a separate tubing 15 provided upstream of the valves 8 and 9 in the conduit connection above the processing vessel 1. (Meantime, the valves 8 and 9 are closed at that time.)

In the process of the invention, it is essential to adjust the velocity of upward flows of the heating and cooling media within a defined range so that granules of solid foodstuff are floated and fluidized adequately by the liquid heating and cooling media in the processing vessel 1.

For instance, in case where granules of solid foodstuff are generally spherical, the flow rate or velocity of the heating or cooling medium needed for fluidizing the granules may be calculated from the following equation:

$$U = 0.825 \, u_t \epsilon^{Z-38};$$

wherein

U is a flow rate or velocity (superficial velocity) in m/sec of the flow of heating or cooling medium needed for fluidizing the granules of solid foodstuff;

$u_t$ is an terminal sedimentation speed in m/sec of the granular solid foodstuff in the medium; and $\epsilon$ is a void fraction of the fluidized bed, which is calculated from the following equation:

$$\epsilon = \frac{\text{Volume of Granule} - \text{Volume of the bed}}{\text{Volume of the bed}}$$

According to the present invention, the flow rate or velocity (U) of the heating or cooling medium may be calculated from the former equation set forth above by setting by value of void fraction ($\epsilon$) within the range of from 0.38 to 0.8 and then substituting the value in the equation. By setting the value of vacancy ratio within the range as defined in the claims, foodstuff granules can be fluidized in the processing vessel and heated evenly and effectively. It has been found that the foodstuff granules may be heated and cooled more effectively and evenly to improve the efficiency of the system particularly by setting the void fraction ($\epsilon$) within the range of from 0.4 to 0.6, more preferably in the range of from 0.42 to 0.5, and by determining the flow rate (U) correspondingly calculated from the equation set forth above. If the void fraction ($\epsilon$) is less than 0.38, the flow of heating or cooling medium is hindered by channelling in the processing vessel 1 to result in or unevenness of the quality of the finished product, or the solid foodstuff granules are not effectively fluidized in the processing vessel 1 so that a fixed layer of foodstuff granules is formed, leading to the result that granules in the upper portion of the fixed layer are heated at a different extent as compared to those in the lower portion of the fixed layer. On the other hand, if the voidage fraction ($\epsilon$) is set beyond the defined range, the flow rate (U) required for fluidization of the heating or cooling medium becomes too high, and a pump having a correspondingly large capacity is needed with the attendant increase in necessary volume of the processing vessel 1, which leads to disadvantageous increase in investment for installation of the system and also leads to increase in operation cost. Although the heat transfer coefficient at the interface between respective granule of solid foodstuff and the heating or cooling medium is increased as the flow rate (U) increases if the foodstuff granules form a fixed bed, the heat transfer coefficient is not so increased as the increase in flow rate (U) when the flow rate exceeds the flow rate at which the bed of the foodstuff granules begin to fluidize, since the viodage fraction ($\epsilon$) is increased correspondingly to the increase in flow rate (U). For the reasons described above, it is desirous that the flow rate (U) be in the defined range.

According to the present invention, a solid foodstuff is heated and/or cooled while being floated and fluidized by the heating and/or cooling medium in the processing vessel 1 by setting the parameters as defined in the claims, whereby any solid foodstuffs of granular form can be conveniently heated and cooled without deriorating the appearance, flavour and taste thereof and without a risk of channelling.

After processed through the heating and cooling steps, the pressure in the vessel is reduced and a discharge opening 16 is opened to discharge the processed foodstuff together with the cooling medium.

The shapes of the processing vessel 1, heating medium storage tank 2 and cooling medium storage tank 3 assembled to form the system of the invention, are not particularly limited provided that they exert the aforementioned functions. However, the processing vessel may have interior countour, for example a funnel-like shape, to facilitate even fluidization of granules of solid foodstuff, or a plurality of inlet ports for the heating and cooling media may be provided to further improve the efficiency of the system. A baffle plate made of a porous material or perforated plate for passing therethrough the heating or cooling medium flowing from the downside of the plate may be provided at the vicinity of the inlet port on the bottom or lower portion of the processing vessel 1, so that the foodstuff to be treated can be retained on such a plate. In addition, a filter, screen or other means may be provided for preventing granules of foodstuff from being carried away from the upper portion of the processing vessel 1 into the conduits 10 and 13. Generally speaking, the illustrated system of the invention may be modified by applying various techniques utilized in the technical field of a so-called fluidized catalyst bed.

It is also possible to heat a foodstuff at a temperature higher than 100° C. and under a pressurized condition, according to the present invention. Specifically referring to the system illustrated in the appended drawing, compressed air may be introduced, for example, through an air feed conduit 14 so that the pressure in the system is raised to suppress boiling of water in the vessel, thereby to heat the foodstuff to a temperature higher than 100° C.

The system used in the present invention may be constructed in the closed system. When a closed system constructed in accordance with the invention is used, contamination of undesirable bacteria can be prevented by applying conventional means utilized in aseptic processing-packaging practices.

If it is desired to apply a pressure in the system during the germ-free operation, sterile pressurized air may be introduced through the air feed conduit 14 to adjust the pressure in the system at the desired level. Furthermore, a sterile cooling medium, such as sterilized cold water, may be prepared and supplied using a conventional sterilizer for liquid.

By applying the system of the invention to the aseptic operation, the entire structure may be simplified with a few moving parts to minimize a potential risk of the bacteria getting into the system. Additionally, a thermometer and a pressure gauge may be attached to the walls of processing vessel and/or on the conduits, as desired, to monitor and control the process parameters easily.

By the practice of the present invention, even and efficient heating and cooling can be effected as the aimed merits of the invention, and additional merits are obtainable in that the heating and cooling media may be effectively recovered and reused to reduce energy usage to an extremely low level.

In the process of the invention, heating and cooling treatments of foodstuff may be carried out semi-continuously by cyclicly repeating the sequential steps including the step of charging granules of solid foodstuff into the processing vessel 1 and the step of the heating and cooling the foodstuff followed by discharging the processed product.

In a further modified system, a plurality of processing vessel can be provided while supplying the heating medium from a single heating medium storage tank and supplying the cooling medium from a single cooling medium storage tank, and the manifold valves are provided to feed the heating medium to one processing vessel and to feed the cooling medium to another processing vessel while the other processing vessels being in the charging or discharging operations, whereby the ideling time of the entire system can be avoided.

Another important merit of the system of the invention is that the heating or cooling medium is forcibly recirculated between the processing vessel 1 and the heating or cooling medium storage tank 2 or 3 during the step of heating or cooling the foodstuff so that the temperature of the heating or cooling medium supplied into the processing vessel is kept at a virtually constant temperature at all times.

What is claimed is:

1. A process for preparing aseptically a heat treated granular solid food in a batch operation, comprising feeding a granular solid food having a granule diameter of from 3 to 45 mm through a charging port into a sealable processing vessel with a funnel-shaped bottom to form a bed of said granular solid food, then closing the charging port, while supplying aseptic air into the processing vessel to raise the pressure in the vessel, then supplying a liquid heating medium, which is separately heated in a heating tank, from the bottom of the processing vessel into said processing vessel at flow rate such that the void fraction of said bed of said granular solid food becomes 0.38 to 0.8 sufficient to subject said granular solid food to heat treatment at a temperature of more than 100° C. in a fluidized condition for a time sufficient to effect sterilization of said granular solid food uniformly at the center portion of each granule, and subsequently supplying a liquid cooling medium, which is separately cooled in a cooling tank, from the bottom of the processing vessel into said processing vessel at a flow rate such that the void fraction of said bed is held within 0.38 to 0.8 sufficient to cool said granular solid food in a fluidized condition.

2. The process for preparing a heat treated granular solid food as claimed in claim 1, wherein said heating and cooling steps are carried out so that said granular solid food is heat treated and then cooled in a fluidized condition having a void fraction of the bed from 0.4 to 0.6.

3. The process for preparing aseptically the heat treated granular solid food as claimed in claim 1, wherein the granular solid food is at least one material selected from the group consisting of beef, pork, chicken, bacon and sausage.

4. The process for preparing aseptically the heat treated granular solid food as claimed in claim 1, wherein the granular solid food is at least one material selected from the group consisting of radish, carrot, potato, mushroom and pumpkin.

5. The process for preparing aseptically the heat treated granular solid food as claimed in claim 1, wherein the granular solid food is at least one material selected from the group consisting of soybean, greenpeas and red bean.

6. The process for preparing aseptically the heat treated granular solid food as claimed in claim 1, wherein the granular solid food is at least one material selected from the group consisting of orange, pineapple, raisin and peach.

7. The process for preparing aseptically the heat treated granular solid food as claimed in claim 1, wherein the heating tank contains a heating coil.

8. The process for preparing aseptically the heat treated granular solid food as claimed in claim 1, wherein the cooling tank contains a cooling coil.

* * * * *

UNITED STATES PATENT AND TRADEMARK OFFICE
CERTIFICATE OF CORRECTION

PATENT NO. : 4,882,188
DATED : November 21, 1989
INVENTOR(S) : Hiroshi Sawada et al It is certified that error appears in the above-indentified patent and that said Letters Patent is hereby corrected as shown below:

On the title page, Item [73] Assignee: change "Nakamura & Partners, Tokyo, Japan" to --House Food Industrial Co., Ltd., Osaka 577, Japan and Regents of the University of California, Berkeley, California--

Signed and Sealed this

Twenty-ninth Day of March, 1994

Attest:

BRUCE LEHMAN

Attesting Officer         Commissioner of Patents and Trademarks